United States Patent Office 2,955,320
Patented Oct. 11, 1960

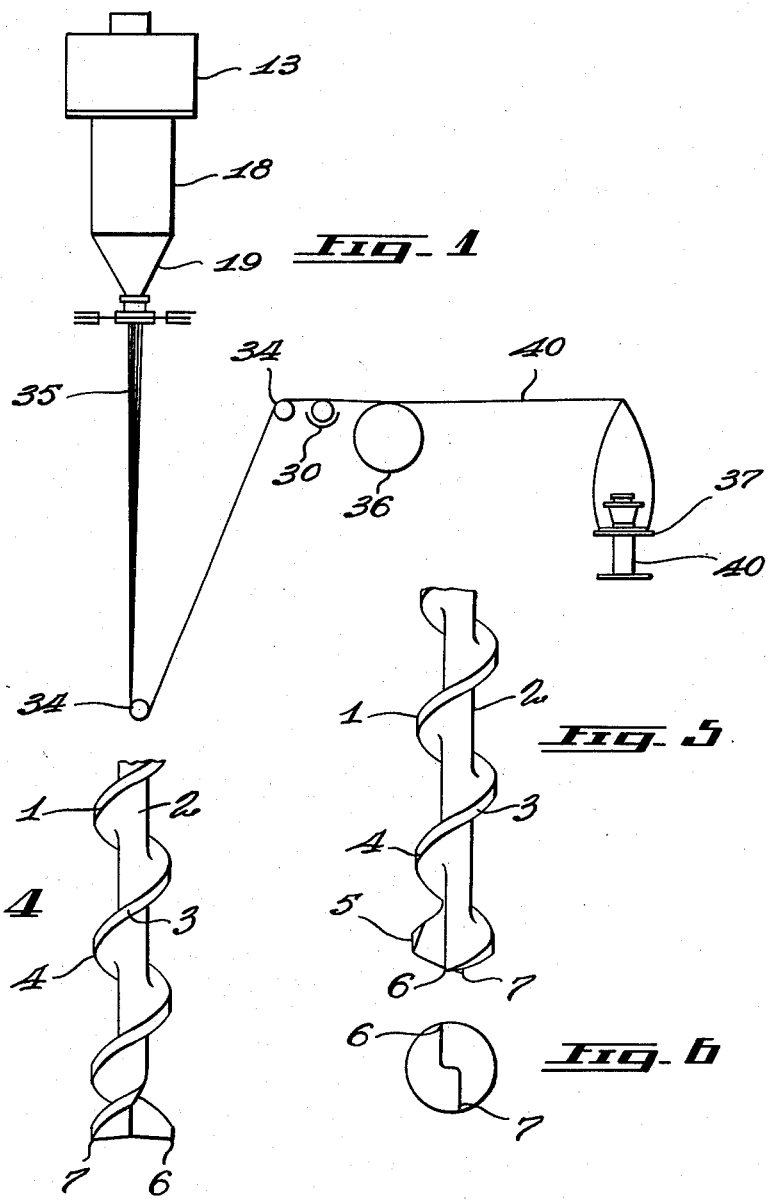

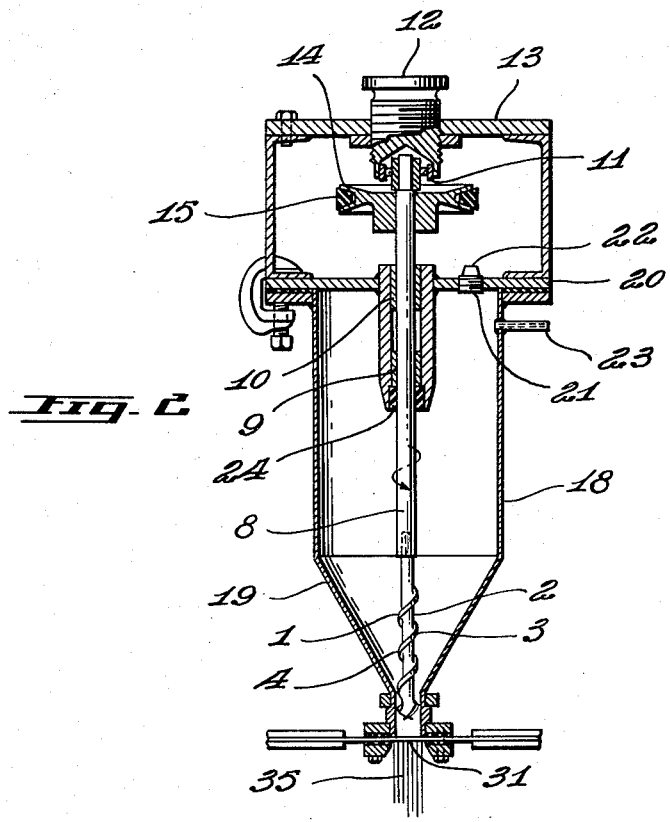
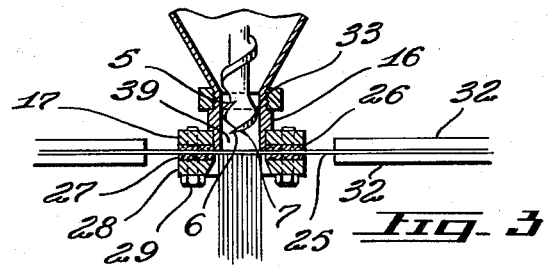

2,955,320

ARTIFICIAL FIBER PRODUCTION

Walter McKinnon Palmer and Napoleon Lucien Larue, both of Drummondville, Quebec, Canada, assignors to Canadian Celanese Limited, Montreal, Quebec, Canada Filed June 3, 1957, Ser. No. 663,225

6 Claims. (Cl. 18—8)

This invention relates to the production of artificial textile fibers and other filamentary products for example bristles, straws, ribbons and the like, and particularly to a method and apparatus for the production of artificial filamentary products from fusible filament-forming materials for example cellulose acetate.

Conventional extrusion machines are not suitable for melt spinning unplasticized cellulose acetate since this polymer degrades and discolours if it is subjected to temperatures higher than its melting point for longer than one minute.

British Patent 534,243 recognized the desirability of melt spinning cellulose acetate filaments without the use of solvents or plasticizers. This patent suggests that cellulose acetate must be rapidly heated to a plastic state, expeditiously extruded to the desired form, stretched and rapidly cooled. Whilst the patent mentions thermal degradation, depolymerization, discolouration, loss of acetyl and caramelization as difficulties to be overcome it does not suggest an apparatus which is entirely suitably for extruding unplasticized cellulose acetate continuously without degrading it excessively.

United States Patents 2,605,502 and 2,657,430 suggested extruding cellulose acetate by compressing the powder into bands, rods or pellets prior to melting it. These methods require rather complicated apparatus to form the compressed band continuously. If pellets are used there is the problem of supplying new pellets without disturbing continuity of spinning.

Canadian Patent No. 529,598 describes a method and apparatus which is applicable to cellulose acetate, the filament-forming material in powdered form is urged against one side of a heated plate having one or more spinning orifices, so that the powdered material is fused by heat supplied from said plate. Fresh powdered material is continuously supplied to said plate while the fused material is drawn away through the orifices in the form of filaments. The urging of the powdered material against the plate can be effected by intermittently applying a mechanical pressure to the layer of powdered material in contact with the plate. Fresh powdered material can thus be supplied in very small quantities between successive applications of pressure. This enables quite a thin layer to be maintained. A specific method of applying the intermittent pressure is by means of vanes extending from a rotating spindle disposed at right angles to an orifice plate, located at the bottom of a circular well in which the vanes rotate. A specific way of heating the plate is by generating heat in the substance of the plate itself, for example, by passing an electric current of high amperage through the plate.

This overcomes the problem of heat degradation of the cellulose acetate powder but does not provide a completely satisfactory means for feeding the powder and forcing it against the heated plate. For example, by applying a mechanical pressure intermittently neither the feeding of the powder nor the pressure on the powder are continuous and continuity of spinning is affected adversely. Another method employing a screw or rotating vanes was suggested and tried but the control of powder feed by vertical motion of the screw proved to be unsatisfactory.

Having regard to the foregoing, the present invention provides an improved method and apparatus for the production of artificial filamentary products from powdered, fusible, filament-forming materials.

According to the present invention artificial filamentary products are produced from powdered fusible filament-forming material as follows. The fusible material is urged against one side of a plate having at least one spinning orifice by a rotating screw terminating at a substantial distance behind the said plate. The powdered material is fed to one end of a generally cylindrical confined space reaching to and terminated by the plate and fitting round the end of said screw. The fusible material is formed between said screw and said plate into a cylindrical block urged against said plate by the continual supply of fresh powdered material to the rear face of said block. Heat is electrically generated in the plate so that the material at the leading face of said block and remote from the screw is fused by heat originating in and supplied from said plate. The fused material is drawn away through the orifice or orifices in filamentary form. The distance by which the end of the screw is spaced from the plate is of the order of one-third to two-thirds of the diameter of the screw. It has also been found that the use of a continuously rotating screw permits a steadier pressure on the cylindrical block of compressed material than possible with the method described in Canadian Patent 529,598. There a mechanical pressure is applied intermittently. The screw improves the steadiness of working of the method and enables higher rates of extrusion to be achieved.

Since the cylindrical space through which the material is urged extends right up to, and is terminated by the rear face of the plate, it follows that the area of the plate to which the material is fed is substantially equal to the cross-section of the cylindrical space swept by the screw. However, it is preferred that the generally cylindrical space as it leaves the end of the screw in the direction of the plate should be slightly flared so as to facilitate the passage of the cylindrical block of material towards the plate and to minimize the danger of jamming. The block or plug though solid and coherent, apparently does not (at least till actually fused) attain a mean density equal to that of the filament-forming material itself, but remains at about 80–90% of that value, and retains a certain degree of elasticity enabling it to spread slightly under the applied pressure. The degree of flare, however, should be small, e.g. of the order of 1–3° to the axis of the screw and cylinder. For the same purpose of preventing jamming it is desirable that the length of the cylindrical passage should be limited so that the part thereof through which the screw extends has a length of the same order as the diameter of the screw or a little more, say, one to one and a half times the diameter. This permits the screw, rotating idly in the loose powdered material fed to it at one end of the cylinder, to feed the material forward at a rate which is self-adjusting in accordance with the pressure which is developed at the end of the screw.

An apparatus according to the present invention, suitable for carrying out the method described includes the following features. It comprises a vessel adapted to receive the powdered material and terminating in a short cylindrical portion. A plate closes the outer end of the cylindrical portion and has at least one spinning orifice. Electrical means is provided for generating heat in the plate so as to heat said plate to a temperature higher than that of any other part of the apparatus in contact with the filament-forming material. A screw in said vessel extends and fits into the cylindrical portion and terminates at a substantial distance from said plate. Bearing means for the screw is adapted to resist its axial displacement from the plate. Means is provided for rotating the screw so as to urge the material from said vessel along said cylindrical portion and against said plate. For adjustment of the distance between the end of the screw and the upper face of the plate it is desirable to provide means for varying the height of the vessel and of the plates in relation to the screw. The range of variation available should be at least equal to the range of adjustment desired, namely, from one-third to two-thirds of the screw diameter. Thus a range of from one half to twice the radius of the screw is ample to provide desired adjustment. The adjustment of the distance in this way will involve some variation in the length of that part of the vessel in which the screw works. This is frequently immaterial since the length of this part of the vessel is less critical than the distance between the end of the screw and the plate. However, two or more cylindrical vessels of different lengths may if desired be provided so as to keep within permissible limits the length of that part of the vessel in which the screw works.

A convenient form of screw for the purposes of the present invention is a modification of the form of a carpenter's twist bit, preferably of the type having a single flight along the greater part of its length and a double flight for a short distance behind its tip. Such a bit can be modified by grinding off the central entering screw and the side-wall cutting edges, and by grinding the remaining, approximately radial cutting edges so that its lower faces are at a suitable angle to the horizontal. By using a single-flight bit rather than the equally common double-flight type, ample room is left between successive turns for the downward conveying of the powdered material by the rotation of the screw. Where the extra flight comes into being near the tip of the bit, the central stem of the bit fades away so that there is little or no reduction in the area of the space down which the powder is urged. The screw thus formed is rotated, for the purposes of the invention, in the direction reverse to that which would be called for in its use as a drilling bit i.e. in such a direction as to forward material fed to the upper part of the screw down towards the tip. The bit is mounted in suitable bearings adapted to resist an upward thrust and is driven by any convenient means e.g. by pulley and a cord or belt. Since the rate of rotation of the screw is not very critical, it is not essential to provide more positive means for the rotation of the screw.

The drawing away of the fused material can be effected by simply allowing the products emerging from the orifices in the heated plate to fall away by their own weight. Except in the production of bristles and similar heavy filamentary products, however, it is desirable to draw the fused material away at a greater linear rate. This can be done by passing the filaments round a draw-roller driven at the appropriate peripheral speed and disposed at a sufficient distance from the heated plate for the filaments to harden by cooling.

The filamentary products made in accordance with the invention can thus be made in the form of a bundle of fine filaments, e.g. of 20 denier down to 4 denier or less, associated together to form a thread. The thread can be twisted to any desired degree or, alone or in association with other such threads, can be converted into staple fibers for use in staple fiber yarns. A particularly important application of the invention is the production of bundles of filaments of an average filament denier of the order of 10–20 and a total denier of 1000–10,000, for use as the pile yarn in carpets, whether made by conventional weaving methods, or by methods, such as tufting, in which to-and-fro loops of pile yarn are secured at one end to one another and/or to a preformed backing fabric by means of rubber or a rubber-like adhesive.

Alternatively, however, filaments of heavy denier (e.g. of 20–200 denier) can be made, suitable for employment singly or in small groups in the manner of yarns for textile purposes, or, by the use of a single orifice in the plate, still heavier filaments of up to 4000 denier or more can be produced for such purposes as bristles. Or again, by providing an orifice in the plate in the form of a slit, narrow bands or ribbons, or strawlike products can be made, of a width of the order of 1–5 mm. or more. Such products can be drawn-down from the orifices so as to reduce their denier without losing the width/thickness ratio of their original cross-section.

The degree of draw-down employed for the production of fine filaments, i.e. the ratio between the area of cross-section of the orifices in the plate and the area of cross-section of the filaments, is preferably of the order of 200 to 2000 or more. For heavy filaments, however, a lower degree of draw-down can be employed, ranging from unity upwards according to the denier of the products required. The possibility of using a high degree of draw-down makes it unnecessary to use very fine orifices in the plate, and enables the same orifices to be used for filaments of very different deniers. Thus, orifices of the order of 0.02" or more in diameter, which offer no special difficulty in production, can be used, and the denier of the resulting filaments determined by the degree of draw-down. From the draw roller by which the draw-down is effected, the filaments proceed to a collecting device, e.g. to a simple reel or, in the case of a bundle of filaments to be formed into a continuous filament yarn, to a cheese package, spinning bobbin or other winding device. On their way from the heated plate to the collecting device, the filaments may be treated with an anti-static lubricant or other finish.

The method and apparatus described above for the spinning of powdered filament-forming materials can be successfully operated in air at atmospheric pressure. As in Canadian Patent 529,598, however, certain advantages can be obtained by maintaining an atmosphere of an inert gas (e.g. of nitrogen) about the powdered material supplied to the plate particularly as regards the range of temperature to which the plate may be heated without damage to the resultant filaments by charring, or other defects. Or again, as described in Canadian patent appln. No. 632,012 filed June 4, 1952, a sub-atmospheric pressure (whether of air or of an inert gas) may be maintained about the powdered material to eliminate bubble formation. For these purposes the vessel into which the powdered material is fed for delivery to the heated plate may be provided with a closure and with one or more suitable gas ducts for the exhaustion of said vessel and/or for the supply of inert gas.

By way of example one form of apparatus in accordance with the invention will now be described in greater detail with reference to the accompanying drawings, illustrating preferred apparatus and in which:

Figure 1 is a diagrammatic general arrangement of a fiber producing set-up according to the invention.

Figure 2 is a vertical cross-section partly in elevation of an extruding apparatus forming a part of the set-up shown in Figure 1 now being a preferred apparatus according to the invention.

Figure 3 is an enlarged view of the portion of the apparatus in the neighborhood of the extruding orifices.

Figures 4 and 5 are side elevations of the special extruding screw in respect to the different positions in a greatly enlarged scale over the previous figures.

Figure 6 is a cross-section along the line 6—6 of Figure 5.

The apparatus comprises a screw member generally indicated at 1 and consisting of a central stem 2 having a single-flight projecting helical ridge or vane 3 extending therefrom. The outside diameter of the screw, i.e. the outside diameter of the ridge or vane as at 4 is ¾″. Near the tip of the screw a length 5 of additional vane is introduced, extending about half way round the screw or rather less and disposed diametrically opposite to the principal vane 3. Where the second vane enters, the central stem 2 fades away into the thickness of the two vanes 3 and 5. The pitch of the vanes 3 and 5 is about 1″. Each vane terminates in a lower edge 6 offset by three-thirty seconds of an inch from the centre line of the screw and sloping slightly downwards from the centre outwards, at an angle of about 2° to the horizontal. The lower face of 6 is ground to a radius equal to approximately the diameter of the screw. The screw 1 is fixed into a central bore at the lower end of a shaft 8 mounted in bearings 9 and 10. Ball bearings 11 act also as thrust bearings to resist an upward thrust. The screw may be moved vertically by rotating the threaded cylinder 12 relative to the frame 13. Between the bearings 11 and the guide cylinder 10 is a pulley 14 secured to the spindle shaft 8 and adapted to be driven by a belt 15.

The lower end of the screw 1 fits into a cylindrical member 16 to which is welded a rectangular flange 17. The hopper is composed of a cylindrical portion 18 and a conical section 19, the bottom of the latter is joined smoothly to the top of the cylindrical chamber 16. The hopper 18 and 19 is closed at the top by a plate 20, and secured to the frame 13. The plate 20 is provided with a circular filling aperture 21 for the introduction of the powered filament forming material. The aperture 21 is provided with an air-tight cover 22. A duct 23 enters the side of the hopper 18 for the application of sub-atmospheric pressure within the hopper 18 and 19 and cylinder 16. The seal 24 is capable of holding the sub-atmospheric pressure and allows the shaft 8 to be moved in a vertical direction by means of 12.

Beneath the rectangular flange 17 is secured a jet strip 25 of stainless steel 0.055″ in thickness sandwiched between two layers of insulating material 26 and 27 and clamped up against the flange 17 by a clamping plate 28 and screws 29. The jet strip carries a current of 300 to 400 amperes. The upper layer of insulating material 26 is formed with an aperture into which the cylindrical member 16 fits; the lower layer 27 is formed with a similar aperture co-extensive with the bore of the member 16. The jet strip is formed with fifteen spinning orifices 31, each 0.04″ in diameter and arranged in a circle 0.5″ in diameter. To the ends of the strip 25 are secured heavy copper leads 32 for the supply of electric current for the purpose of heating the strip. The member 16 though generally cylindrical, is slightly flared from the point 33 down to the rear face of the jet 25 at an angle of about 2° to the axis of the screw 1. Beneath the strip assembly 25 and 31 and in line with the axis of the screw 1 is a yarn guide 34 for conducting filaments 35 emerging from the orifices 31 to a feed roller 36 supplying the filaments to a take-up device 37.

OPERATION

In the operation of the spinning apparatus described above, powdered filament-forming material is fed in through the filling aperture 21 which is then closed. Vacuum is applied through the duct 23 so to reduce the pressure in the hopper 18, 19, and cylinder 16 to a sub-atmospheric pressure and current is supplied to the jet strip 25 through the leads 32. The absolute pressure within the apparatus may be reduced to below 10 lb./sq. in. and preferably to a value of 4–5 lb./sq. in. After an interval to allow the jet strip 25 to warm up, the screw 1 is set in motion by means of the link belt 15 and spinning proceeds. The powder at 38 in the hopper 18, 19 is in a loose state and the rotating screw 1 simply produces a mild stirring action. Between the top of the cylinder 16 and the lower end of the screw 1, the powder is converted from its loose, low density state to a highly compressed and dense state so that a dense plug or pellet 39 of solid filament-forming material is formed in the space between the tip of the screw 1 and the jet strip 25. The sweeping action of the bottom of the screw by the faces 7 thereof forces the plug 39 down on the heated jet strip 25 whereby the lower face of the plug is fused and the fused material emerges in the form of filaments 35 from the spinning orifices 31. The filaments are drawn away round the guide 34 by the feed roller 36 and pass over a lubricating device 30 and are collected as a yarn or bundle 40 by the take-up device 37.

The screw 1 is adjusted to be ½″ clear above the jet 25 and can be rotated at about 10 r.p.m., though the rate of rotation is not critical and may vary from 5 to 10 r.p.m. or more. The rate of extrusion does not depend essentially on the rate of rotation of the screw but rather upon the temperature to which the jet plate 25 is raised, which may, for example, be of the order of 350° to 400° C.

Orifice diameters from about 0.008″ to about 0.060″ are preferred.

The method and apparatus described above are applicable to the spinning of a wide range of materials e.g. those specified in Canadian Patent No. 529,598. As already mentioned, cellulose acetate is an example of the materials to which the invention can be applied and the invention has been found particularly useful in relation to the spinning of cellulose acetate of a high degree of acetylation e.g. of the order of 60% or more (calculated as acetic acid).

The applicants' method and apparatus overcome the problems of powder feeding and thermal degradation of the cellulose acetate. The screw supplies new powder, forms the compressed rod or plug, and presses it continuously against the jet strip in one simple rotary operation. The method permits unplasticized cellulose acetate to be raised up to 100% C. above its melting point because it remains in the molten state for less than one minute. The molten cellulose acetate travels a distance of less than one inch before it is extruded through the jet. Normally, there is a volume of not more than about one tenth of a cubic inch of molten cellulose acetate at any one time and any portion of the cellulose acetate remains molten for not more than about thirty seconds. The molten cellulose acetate is never in contact with the screw or any moving parts of the apparatus.

The method and apparatus are suitable for melt spinning many polymers, particularly those which are susceptible to thermal degradation since the residence time and the distance travelled in the molten state are so short.

The materials which can be melt spun by the applicants' process include for example: cellulose diacetate and cellulose triacetate; other organic acid esters or mixed esters of cellulose e.g. cellulose propionate, cellulose acetopropane, cellulose acetobutyrate; cellulose ethers e.g. ethyl cellulose, benzyl cellulose; addition polymers e.g. polyethylene, polystyrene; condensation polymers e.g. polyamides, polyesters; mixtures or blends of the materials mentioned.

The method is particularly suitable for spinning cellulose triacetate since it avoids the use of a solvent, such as methylene chloride, which is corrosive, volatile and toxic.

The following are given as examples of the application of the invention to production of filaments from powdered cellulose acetate of a high degree of acetylation. The temperatures indicated for the jet strip are measured by a thermocouple soldered to the jet strip 25 close to the spinning orifices 31.

Example 1

A pressure-stabilised cellulose tri-acetate of 61% acetylvalue (calculated as acetic acid) and 50 centipoises viscosity (measured at 6% concentration in 90/10 v./v. methylene chloride/methanol at 25° C.) was supplied in powdered form to the apparatus described above, the jet being maintained at a temperature of 390° C. and the screw being rotated at 10 r.p.m. The filaments emerging from the orifices 31 were drawn away at 200 metres per minute and were of an average filament denier of 15, giving a total denier of 225 and a mass rate of output of 5 grams per minute. The resulting yarn had a tenacity of the order of 1.2 grams per denier and an elongation at break of 25% to 30%.

*Example 2*

A cellulose tri-acetate prepared by a method in which only 0.15 percent (on the cellulose) of sulphuric acid is used to catalyse the acetylation, and having a viscosity of 35 centipoises, was supplied in powdered form to the apparatus of the drawing and was spun at a rate of 5 grams per minute and a jet temperature of 385° C. into a yarn (225 denier). The resulting filaments had a tenacity of the order of one gram per denier and an elongation of 35% to 40%.

*Example 3*

The cellulose tri-acetate of Example 2 was spun at a jet temperature of 380° C. and at a rate of 4.7 grams per minute into a yarn of 60 denier, the filaments being drawn away by the feed roller 36 to 700 metres per minute. The resulting yarn containing 15 filaments each of 4 filament denier had a tenacity of the order of 1.4 grams per denier and an elongation of 17%.

*Example 4*

The cellulose tri-acetate of Example 2 was spun into filaments at three different jet temperatures and the delivery speed of the feed roller 36 was adjusted to give, in each case, mean filament deniers of 15 and 4. The resulting tenacities, elongations and rates of output are given in the following table.

| Jet. Temp., °C. | 15 filament denier | | | 4 filament denier | | | |
|---|---|---|---|---|---|---|---|
| | Ten., g./d. | Elong., percent | Linear Speed, m./min. | Ten., g./d. | Elong., percent | Linear Speed, m./min. | Mass rate, gm./min. |
| 360 | 1.04 | 36 | 156 | 1.6 | 16 | 585 | 3.9 |
| 380 | 1.01 | 45 | 184 | 1.4 | 17 | 690 | 4.7 |
| 400 | 0.97 | 52 | 240 | 1.3 | 25 | 900 | 6.0 |

This table illustrates the dependence of the mass rate of output upon the temperature. It also illustrates the way in which elongation increases for a given draw-down with the jet temperature, somewhat at the expense of tenacity, and how, by increasing the rate of draw-down, the tenacity can be increased at the expense of the elongation.

We claim:

1. An apparatus for the production of artificial filamentary products from powdered fusible filament-forming material, comprising a vessel adapted to receive the powdered material and having a main container portion and a short terminal feed tube of reduced cross-sectional area, an electrical resistance plate closing the outer end of the feed tube and insulated therefrom and provided with at least one spinning orifice, a rotatable feed screw in said vessel and extending from said container portion into said feed tube and terminating within said feed tube at a distance from said plate from one-third to about two-thirds the diameter of said feed screw, said feed screw fitting closely in said feed tube whereby the filament-forming material is positively urged into and through said feed tube under the pressure exerted by rotation of said screw, bearing means for said screw adapted to resist positively displacement from said plate in an axial direction, means for rotating said screw to urge the material from the container portion through the feed tube and against said plate, electrical means for passing an electrical current through in the plate thereby to heat it by resistance to a fusion temperature for said material whereby the filament-forming material adjacent said plate is fused to a molten condition and forced through the orifice in said plate in filament form.

2. An apparatus as defined in claim 1 in which the length of the screw within said feed tube is from one to one and one-half times the diameter of the screw.

3. A method of producing artificial, filamentary products from powdered, fusible, resinous material, comprising continuously pressure-feeding the powdered material in a steady stream from a supply source into an unobstructed cylindrical confining passage having an exit defined by an orificed electrical resistance plate insulated from said confining passage remote from the feed, applying a steady pressure against the material in said passage at a distance from one-third to two-thirds the diameter of the passage from said plate effective to press the material in said passage into a solid block, continuously passing an electrical current through the plate effective to heat it uniformly to melt the resinous material adjacent to it, and continuously drawing off in filamentary form molten material through the said orificed plate as fast as it is melted, controlling the feeding to a steady speed effective continuously to maintain the major part of the material in said chamber pressed into a constant-sized solid block being constantly renewed at its feed end while being melted and advanced at the resistance plate, the temperature of the plate being correlated with the feeding speed to convert only a minor thickness of the block adjacent to the resistance plate continuously into a completely molten layer of substantially constant thickness which is continuously replenished from the block as the molten material is drawn off.

4. A method, as claimed in claim 3, in which the resinous material is cellulose acetate and the speed of feed and temperature beig controlled whereby the solid block has a mean density from about 80% to about 90% of the cellulose acetate.

5. A method, as claimed in claim 3, in which the material is cellulose acetate and the temperature of the resistance plate is within the range from about 350° C. to about 400° C.

6. A method, as claimed in claim 3, in which the material is cellulose acetate and the time within which any given portion of the material remains molten is not more than about 30 seconds.

References Cited in the file of this patent

UNITED STATES PATENTS

| 2,369,506 | Weibel | Feb. 13, 1945 |
| 2,595,210 | Clinefelter | Apr. 29, 1952 |
| 2,791,802 | Weber | May 14, 1957 |
| 2,888,711 | Finlayson et al. | June 2, 1959 |

FOREIGN PATENTS

| 721,674 | Great Britain | Jan. 12, 1955 |